UNITED STATES PATENT OFFICE.

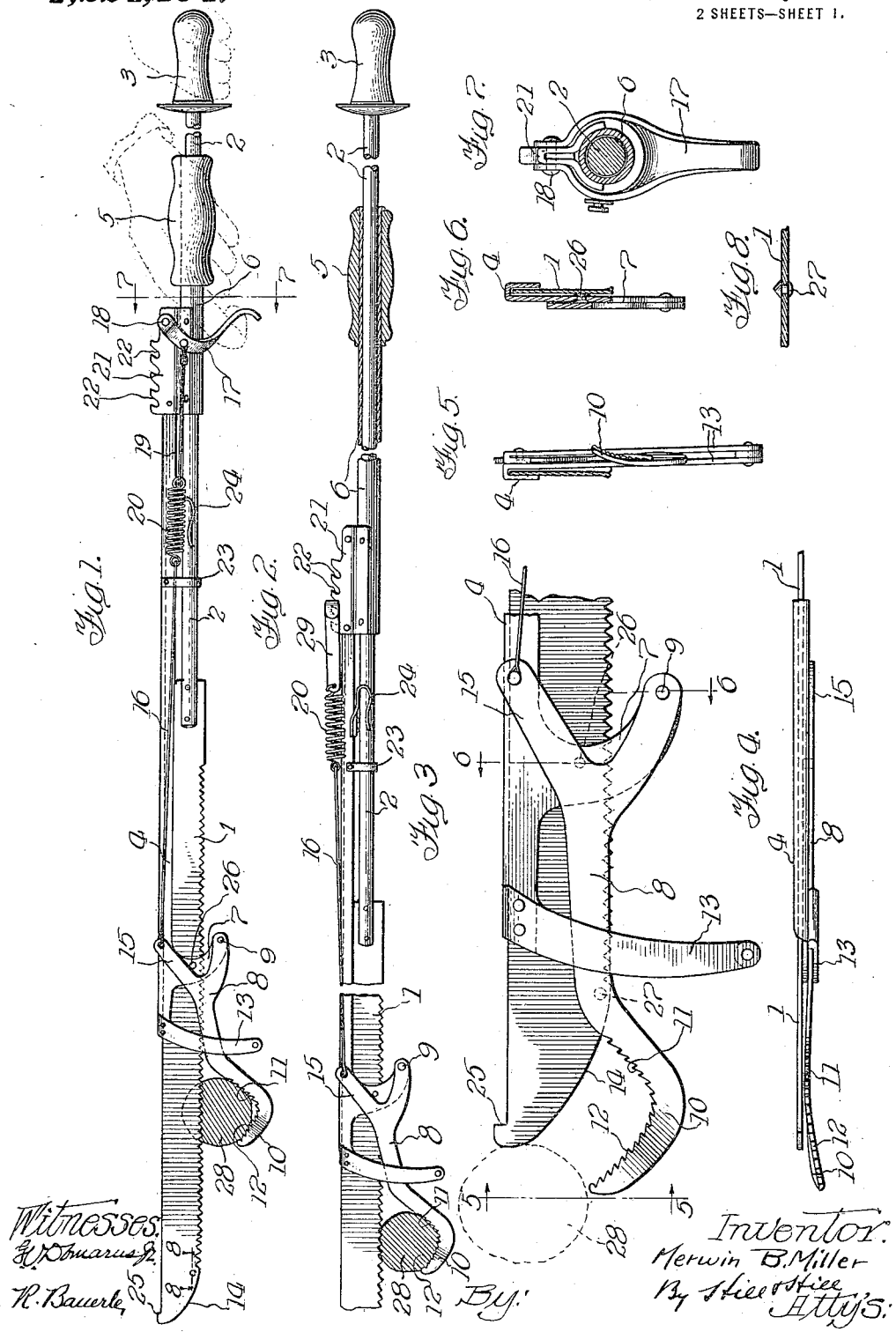

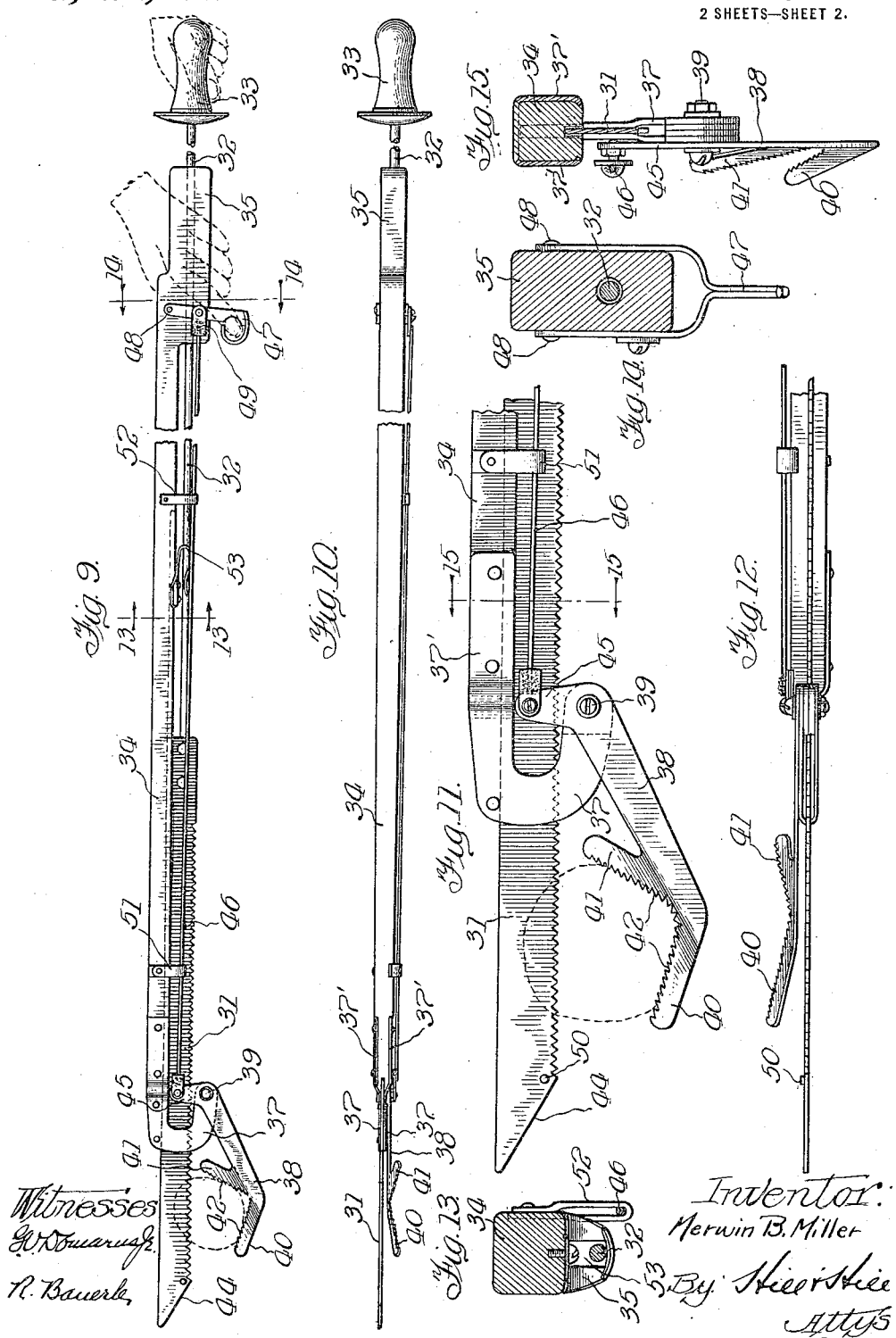

MERWIN B. MILLER, OF WILLARD, UTAH.

PRUNING IMPLEMENT.

1,224,194. Specification of Letters Patent. Patented May 1, 1917.

Application filed September 21, 1914. Serial No. 862,708.

*To all whom it may concern:*

Be it known that I, MERWIN B. MILLER, a citizen of the United States, residing at Willard, in the county of Boxelder and State of Utah, have invented certain new and useful Improvements in Pruning Implements, of which the following is a description.

My invention belongs to that general class of devices known as pruning implements, and more particularly designated as pruning saws. With my improved device the saw is maintained in its cut and may be controlled with the desired amount of pressure upon the same. In the preferred construction the same is made so that it may be handled or operated at some distance away from the branch or limb to be severed. With the improved construction a comparatively thin saw blade may be employed, the device operating in as efficient a manner as if an ordinary hand saw. The invention has among its objects the production of a device of the kind described that is simple, convenient, durable, efficient and satisfactory, that may be used wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a side elevation of one form of my device;

Fig. 2 is a similar view of a portion of the same, showing a modified adjustment;

Fig. 3 is an enlarged view of a portion of the device;

Fig. 4 is substantially a top view of the same;

Fig. 5 is an end elevation looking substantially from the line 5, 5 of Fig. 3, the saw blade being shown in section;

Fig. 6 is a sectional view taken substantially on line 6, 6 of Fig. 3;

Fig. 7 is a sectional view taken substantially on line 7, 7 of Fig. 1;

Fig. 8 is a sectional view taken substantially on line 8, 8 of Fig. 1;

Fig. 9 is a side elevation of a slightly different form of my device;

Fig. 10 is a top elevation of the same;

Fig. 11 is an enlarged view of a portion of the same;

Fig. 12 is a plan view of the under side of the same;

Fig. 13 is a sectional view taken substantially on line 13, 13 of Fig. 9;

Fig. 14 is a sectional view taken substantially on line 14, 14 of Fig. 9, and

Fig. 15 is a sectional view taken substantially on line 15, 15 of Fig. 11.

Referring to the drawings, first to Figs. 1 to 8 inclusive, 1 represents a suitable saw blade, which is preferably provided with an extended operating rod or member 2 of suitable length, having a handle 3 for convenience in grasping and operating. A frame 4 is provided, which for convenience in holding and operating the device, may be provided with a handle or grip 5. As shown, the handle 5 is mounted on a tube or casing 6 of the desired length, which is secured to the frame 4, the operating rod 2 projecting through the tube 6.

Arranged on the frame 4, preferably at the free end thereof, is an arm 7, and pivotally secured thereto at 9 is an arm 8, which is extended as at 10 in the form of a hook and provided with teeth, or serrated at 11 and 12. Two members 13 suitably secured to frame 4 form a guide for the member 8, and afford a very rigid construction. The end of the saw is preferably rounded as at 14, as will be more fully described hereafter. Arm 8 is provided with an extension 15, the arm 8 and extension 15 being pivotally secured at 9 to the part 7, forming substantially a bell-crank. Member 8 is controlled or operated by a rod 16, or its equivalent, which extends back into near to the handle 5, and is arranged to be controlled in any desired manner. In Fig. 1 rod 16 is connected through a link 19 to a trigger 17, pivotally secured at 18 to a part 21, carried on the frame and tube 6. If desired, a spring 20 may be arranged as shown. Where the spring is omitted, the member 16 may, of course, extend directly to the trigger 17, and be secured thereto. In Fig. 2, member 16 is secured to the spring 20, which is secured to a hooked member or link 29, adapted to fit or engage in any of the notches 22 in the member 21. One or more guides 23 may be provided on the frame 4 for guiding the member 16, if so desired. Likewise, one or more guides 24 may be arranged on the frame for the rod 2. This is particularly desirable where the rod 2 and frame 4 are of considerable length. Guide 24 may also be so positioned that it will act as a stop for the saw. The same being more or less resilient in the preferred construction, maintains the rod 2 in place, but permits its giving slightly in case of strain. Where the member 24 is not employed, a stop 25 may be arranged at the end of the saw, adapted to engage with the frame 4 when the saw is drawn back a sufficient distance. If desired, a member 26 may be provided on the frame part 7 to maintain the saw out of engagement with member 7, this being particularly desirable since ordinarily the teeth are set in the usual manner. I also show a member 27 at the end of the saw (see Figs. 1, 3 and 8) the purpose of the same being to prevent the saw being drawn through the cut during the sawing operation. A limb or branch 28 is shown, and in Fig. 1 the saw is partly cut through the same. In Fig. 3, however, the parts are shown in the position just before pushing the saw into engagement with the limb. The operation of the device will be more fully described hereafter.

In the form of device shown in Fig. 9, the construction is very similar, but with slight changes. In the construction previously described a metal frame was shown, while in the construction shown in Figs. 9 to 15 a wooden frame is shown. However, it will be obvious that the frame shown in Figs. 9 to 15 may be modified and constructed of other material, if so desired. Referring to these figures, 31 represents a saw blade, which is secured to the operating rod 32, provided with a grip or handle 33. The frame 34 is slotted to receive the saw back, and provided with a grip 35. At the end of the frame 34 is a frame part 37, preferably consisting of the two similar parts 37, which are extended as at 37' and secured to 34. The two members are secured together and member 38 pivotally secured thereto at 39. The member 38 is formed with a forked end 40, 41, preferably serrated as at 42. Arm 38 is also formed with an extension 45 forming a bell-crank, to which is secured a rod or operating member 46, which may be suitably secured to a trigger 47, pivotally secured to the frame at 48. As shown, member 46 is secured to a link 49, which is pivotally secured to the trigger. I have shown the members 51 and 52 for guiding and bracing rod 46 and a guiding member 53 for the rod 32. This last mentioned member 53 is shown so positioned as to form a stop for the saw. I have shown a member 50 on the saw blade, similar to member 27 in the other construction, and the saw is preferably beveled or cut at an angle as at 44.

The operation of the device shown in Figs. 1 to 9 is substantially as follows: The grip 5 is taken in one hand and the handle grip 3 in the other, and the saw and end 10 or arm 8 brought up to the limb, as indicated in Fig. 5. The device is then pushed toward the limb, slightly raising the saw, if necessary, member 8 being prevented from moving upwardly or with the saw by the branch to be cut. Pressure on the device toward the branch causes the saw to ride up on the branch, and the branch is engaged by the serrated teeth 11 and 12, so that the device is securely clamped to the tree branch. The grip 5 may then be held and the saw operated through the grip 3 and rod 2. The limb or branch of the tree is prevented from swaying by the member 8. The pressure of the saw upon the branch is controlled by means of the trigger 17, operating through the rods 19 and 16 on the bell-crank 8, 15. Where the device is of considerable length, the tube 6 being extended some distance and the rod 2 correspondingly lengthened, the construction shown in Fig. 2 may be employed. In this case, however, the pressure on the arm 8 cannot be controlled while sawing since it is necessary to remove the saw in order to adjust the position of 29 in the notches 22 to vary the pressure. However, the notches 22 form adjustments for various sized limbs or branches.

The operation of the device shown in Figs. 9 to 12 is exactly similar except that the trigger 47 is shown for controlling a slightly different shaped member 38, which corresponds to Fig. 8 on the first mentioned construction. With either device the branch may be sawed off, even though considerable distance from the operator, without difficulty, the limb being maintained steady to prevent it from swaying or sagging. The advantage of the construction shown in Figs. 1 and 9 where the trigger is employed is that the pressure may be conserved on the back stroke, and a better control of the pressure over a wide range of limbs is obtained, adapting it to any size from a small twig to a large limb. Where the spring is omitted between the bell-crank and the trigger 1 and link, similar to that shown in Fig. 9, a more positive and more complete control is obtained, since the operator can positively manipulate the jaws of member 38. While the spring is shown in Fig. 1, that is merely for illustration, a rigid connection being ordinarily more desirable.

Having thus described my invention, it is obvious that various immaterial modifications may be made in the same without departing from the spirit of my invention;

hence I do not wish to be understood as limiting myself to the exact form, construction, arrangement or combination of parts herein shown and described, or uses mentioned.

What I claim as new and desire to secure by Letters Patent is:—

1. A saw, a carrier therefor arranged to slidably embrace the back edge of the saw, said carrier extended at one end to form a handle, an operating rod for said saw extending to the handle end of said carrier, means carried by the saw blade for limiting the movement of the saw, and means for maintaining the saw in operative relation with the work to be cut, comprising a V-shaped part having an extended part pivotally secured to the carrier and formed with an extension at one side forming substantially a bell-crank lever, a controlling rod secured to said extension and extending back toward the handle end of said carrier, and adjustably secured thereto.

2. A saw, a carrier therefor arranged to slidably embrace the back edge of the saw, said carrier extended at one end to form a handle, an operating rod for said saw extending to the handle end of said carrier, means on said carrier for engaging a portion of the saw blade and limiting the movement of the saw toward the handle, and means for maintaining the saw in operative relation with the work to be cut, comprising a V-shaped part having an extended part pivotally secured to the carrier and formed with an extension at one side forming substantially a bell-crank lever, a controlling rod secured to said extension and extending back toward the handle end of said carrier, and secured to a trigger arranged thereat.

3. In a device of the kind described and in combination, a suitable saw blade having one end cut at an angle and provided with a lug projecting beyond the face of the saw at said end, a grooved carrier for said saw, said saw arranged in said groove and slidably movable relative the carrier, a yoke carried at the end of said carrier and embracing the saw, a work clamping member pivotally carried by said yoke, said carrier provided with a handle at one end, a saw operating rod secured to the saw and extending to near the said handle, and controlling means for said work clamping member mounted on said handle, and operatively connected with the work clamping member.

4. The combination in a device of the kind described of a grooved member of suitable material having a handle at one end, a saw blade slidably arranged in said groove, means for maintaining said blade in place, an operating rod on said blade secured thereto and extending to adjacent the handle, a V-shaped member pivotally secured to said grooved member adjacent the saw and movable toward the cutting edge thereof, and means for controlling said V-shaped member as desired.

5. A pruning device of the kind described, comprising the combination of a tubular pole, a reciprocating saw arranged at one end of said pole and carried thereby, an operating rod for reciprocating said saw, said rod secured thereto and extending through said tubular pole to the opposite end thereof, means arranged at the end of said pole adjacent said saw for engaging the work and drawing the saw through the work transversely to its direction of reciprocation and controlling means therefor carried by the pole and extending to the opposite end thereof, said controlling means operable independently to the movement of the pole.

6. A pruning device of the kind described and in combination, a pole, a saw arranged at one end of said pole and carried thereby, means extending from said saw to the opposite end of the pole for reciprocating the saw lengthwise, means pivotally mounted on the end of the pole adjacent to said saw for engaging the work to be cut, and means coöperating with said last mentioned means for moving the saw transversely to its direction of travel during the reciprocation thereof.

7. In a pruning device of the kind described and in combination, a pole, a saw, carried on the end thereof, means extending to the opposite end of the said pole for reciprocating said saw, means for limiting the movement of said saw, and means pivotally mounted on the pole end proximate the saw and controllable from the opposite end of the pole for moving said saw transversely the work simultaneously with the reciprocation of the saw.

8. In a device of the kind described and in combination, a pole, a saw positioned at one end of said pole and arranged to reciprocate lengthwise thereof at said end, an operating rod for said saw extending through to the pole of the opposite end thereof, means for engaging the work to be cut and transversely moving the pole end and said saw simultaneously with the reciprocation of the saw, comprising a serrated member arranged at the saw end of the pole and formed to engage the work on the side opposite the saw and means coöperating with said serrated member.

9. In a pruning device of the kind described and in combination, a pole, a saw blade positioned at one end of said pole, said pole provided with a groove of a size to receive the back edge of said saw blade, an actuating rod for reciprocating said saw blade, said rod operatively connected with the saw and extending through the pole to the opposite end thereof, means carried by said pole at the saw end thereof for engaging the work to be cut by said saw and preventing movement thereof relative the end of the pole and drawing the saw through the work in a direction transversely to its direction of reciprocation, comprising a member having a serrated edge formed to engage the work at a plurality of points, said member pivotally connected to said pole and adjustable controlling means connected with said member and extending therefrom toward the opposite end of the pole.

In testimony whereof, I have hereunto signed my name in the presence of two subscribing witnesses.

MERWIN B. MILLER.

Witnesses:
J. H. BEASLEY,
L. C. BRUNKER.

Copies of this patent may be obtained for five cents each, by addressing the "Commissioner of Patents, Washington, D. C."